United States Patent
Haase et al.

(10) Patent No.: US 8,606,853 B1
(45) Date of Patent: Dec. 10, 2013

(54) SYSTEMS AND/OR METHODS FOR SERVER-CONTROLLED DISPLAY OF NESTED MULTI-LEVEL CLIENT DIALOGS

(75) Inventors: Torsten Haase, Saarbrücken (DE); Michael Wieczorek, Dillingen (DE)

(73) Assignee: Software AG, Darmstadt (DE)

( * ) Notice: Subject to any disclaimer, the term of this patent is extended or adjusted under 35 U.S.C. 154(b) by 0 days.

(21) Appl. No.: 13/491,050

(22) Filed: Jun. 7, 2012

(51) Int. Cl.
   *G06F 15/16* (2006.01)

(52) U.S. Cl.
   USPC .......................... 709/203; 715/809; 715/975

(58) Field of Classification Search
   USPC ....................................................... 709/203
   See application file for complete search history.

(56) References Cited

U.S. PATENT DOCUMENTS

| | | | |
|---|---|---|---|
| 6,973,626 B1 | 12/2005 | Lahti et al. | |
| 6,983,421 B1 | 1/2006 | Lahti et al. | |
| 7,100,195 B1 * | 8/2006 | Underwood | 726/2 |
| 7,412,655 B2 | 8/2008 | Wada et al. | |
| 7,469,302 B2 | 12/2008 | Whittle et al. | |
| 7,721,225 B2 * | 5/2010 | Montroy et al. | 715/809 |
| 2002/0023057 A1 * | 2/2002 | Goodwin et al. | 705/50 |
| 2002/0166000 A1 * | 11/2002 | Rossi et al. | 709/328 |
| 2003/0218636 A1 * | 11/2003 | McIntyre et al. | 345/809 |
| 2004/0268225 A1 * | 12/2004 | Walsh et al. | 715/501.1 |
| 2005/0160322 A1 * | 7/2005 | West et al. | 714/38 |
| 2005/0257167 A1 * | 11/2005 | Fraleigh et al. | 715/809 |
| 2008/0114709 A1 * | 5/2008 | Dixon et al. | 706/13 |
| 2008/0184164 A1 | 7/2008 | Di Fabbrizio et al. | |

* cited by examiner

*Primary Examiner* — Tauqir Hussain
(74) *Attorney, Agent, or Firm* — Nixon & Vanderhye PC (57) ABSTRACT

Certain example embodiments described herein relate to server-controlled display techniques for nested multi-level client dialog boxes. On the client side, standard dialog elements are shown in the dialog box. Client-side events, e.g., caused by user interaction with the dialog box, are converted to parameters for a function call to the server and are processed there. The dialog box display may be updated by transferring (possibly only) dialog item changes that result from the function call back to the client. The server may process separate threads and bundle dialog and sub-dialog data in one function, and the server may split the bundled data for dialog and/or sub-dialog box rendering, as appropriate. Thus, an advantage of certain example implementations is that no dialog-specific logic (e.g., data access, dialog specific functions, etc.) needs to exist on the client side. Instead, the client side may simply render a fixed set of dialog box items.

19 Claims, 7 Drawing Sheets

SYSTEMS AND/OR METHODS FOR SERVER-CONTROLLED DISPLAY OF NESTED MULTI-LEVEL CLIENT DIALOGS

FIELD OF THE INVENTION

Certain example embodiments described herein relate to techniques for displaying dialog boxes on a client computer. More particularly, certain example embodiments described herein relate to server-controlled display techniques for nested multi-level client dialog boxes. In certain example embodiments, only the data required to render the dialog boxes in the client-side application is transmitted from the server to the client, thereby advantageously helping to avoid the sending and execution of client-side scripts/programs for handling renderings and user interactions.

BACKGROUND AND SUMMARY OF EXAMPLE EMBODIMENTS OF THE INVENTION

Dialog boxes in software applications are known to be useful ways of communicating information to users. Dialog boxes may be used to provide users with various forms of alerts including, for example, alerts to flag errors (e.g., in the execution or interpretation of underlying code), to indicate the need for more information (e.g., when filling out an online form), to prompt a user for a specific action (e.g., a Yes/No or other decision), etc. In many cases, only one dialog box can be opened at a time, and the simultaneous opening of a further sub-dialog box is not possible.

Limitations concerning the display of one dialog box at a time are not always troublesome. Indeed, in some instances, it is desirable to halt processing until user input is received, until a user is made aware of a possible problem, etc., thereby suggesting that the "one dialog box at a time" restriction is not really a problem in some contexts. However, this is not always the case.

Indeed, in some cases, it might be desirable to display nested or sub-dialog boxes, e.g., while processing is ongoing. As another example, it is not always possible to display sub-dialog boxes or even dialog boxes providing user hints while a first or "main" dialog box is open. In such a scenario, if a hint is desired for display (e.g., upon user request or automatic suggestion), the first dialog box has to be closed for the duration of the display of the new dialog box. The new dialog box can be displayed but, after the user is finished with it, the original dialog box has to be re-opened, potentially with the updated data. This scenario might arise, for example, when additional data based on user interactions has to be requested (e.g., to fill dialog box elements), which is quite common with today's applications. The programming therefore becomes quite complicated for the developer, as many different possibilities need to be handled and potentially hard-coded. Even dialog boxes that, for example, indicate incorrect entries to the user tend to be treated in this way and thus tend to require complicated programming.

There are approaches for displaying sub-dialog boxes in the client-server context. For instance, in some implementations, a complete JavaScript-script is created on the server and is transferred to the client. In such cases, the program logic for running the dialog box is completely on the client side. Oftentimes, these solutions run inside a web browser. A server call delivers HTML and/or JavaScript code, which is executed inside the browser environment on the client side. All dialog box code and handler functions are contained in the delivered code. When the dialog box needs to display data from the server, this data either has to be transferred in advance or by calling other methods from the client side handler functions. This approach is very often used in web applications. See, for example, U.S. Pat. No. 7,721,225, the entire content of which is hereby incorporated herein by reference.

It is believed that multiple sever-controlled dialogs cannot be opened on the client side at present, without processing program logic on the client side. Instead, a browser environment that provides form elements (e.g., a subset of dialog box controls) is needed at runtime, as is a JavaScript interpreter that executes the code transferred to the client.

Moreover, transferring the entire dialog box logic to the client also typically requires all initial data (e.g., list content) to be contained in this code. This approach therefore mixes data and logic and leads to potentially expensive server calls, for example, when complex data needs to be updated and, thus, requested from the server (e.g., because of the "long way" between the code and data). Indeed, Internet research performed by Alexa Internet, Inc., on the world's top 100 websites shows web pages including JavaScript code load times are slower than those that lack JavaScript code by 31%. Thus, it will be appreciated by those skilled in the art that there are problems with high code complexity, data and program logic intermingling, expensive server calls that take up a good deal of processing resources, and/or the like.

Thus, it will be appreciated that there is a need in the art for improved techniques for displaying dialog boxes and sub-dialog boxes that overcome some or all of these and/or other problems.

One aspect of certain example embodiments relates to techniques for displaying dialog boxes and sub-dialog boxes simultaneously, where data (and not, for example, program logic) is transferred to make this possible.

Another aspect of certain example embodiments relates to implementing control logic on a server (and not, for example, on the client), thereby providing faster access to needed data.

Another aspect of certain example embodiments relates to the server-side management of nested dialog boxes that enable users to switch from dialog box to sub-dialog box and vice-versa while still keeping the information synchronized.

Still another aspect of certain example embodiments relates to the handling of separate threads on the server side, bundling dialog and sub-dialog box data in one function, and then splitting the data on the client side for dialog and/or sub-dialog box rendering, as appropriate.

In accordance with certain example embodiments, a method for displaying dialog boxes on a client computer system is provided. When it is determined by a server computer system that a first dialog box is to be displayed on the client computer system, first dialog box data and first dialog box state data are transmitted from the server computer system to the client computer system, in order to prompt the client computer system to display the first dialog box in accordance with the first dialog box data and first dialog box state data and to make the first dialog box a currently active dialog box. Current dialog box state data associated with the currently active dialog box is received, at the server computer system and from the client computer system, following a registered change event detected via the client computer system. A dialog box function associated with the received current dialog box state data is processed, via the server computer system and independent from the client computer system. When the current dialog box state data indicates that a new sub-dialog box is to be displayed, as determined by the server computer system, the server computer system is used to: create a new server dialog box object for the new sub-dialog box; create an entry for the new server dialog box object in a registry located on the server computer system;

bundle together second dialog box data and second dialog box state data for the new sub-dialog box, with the current dialog box state data and current dialog box data; and transmit the bundled together data to the client system, in order to prompt the client computer system, after the client computer system has split apart and processed the bundled together data, to display the current dialog box in accordance with the current dialog box state data and the current dialog box data, to display the new sub-dialog box in accordance with the second dialog box data and second dialog box state data, and to make the new sub-dialog box the currently active dialog box. Otherwise, any updated dialog box data and dialog state box data is transmitted to the client system, in order to prompt the client computer system to correspondingly update the display of the currently active dialog box.

In accordance with certain example embodiments, a method for displaying dialog boxes on a client computer system is provided. A main dialog box is caused to be displayed on the client computer system. A plurality of sub-dialog boxes is caused to be displayed on the client computer system, with the sub-dialog boxes and the main dialog box being linked together in parent-child modal relationships. Changes to a child box are caused to be reflected in a parent box upon the child box being closed. The client computer system includes program logic for rendering a fixed set of dialog box elements but lacks dialog box specific program logic, and the dialog box specific program logic is provided to a server computer system in communication with the client computer system.

In accordance with certain example embodiments, a dialog box/sub-dialog box control system is provided. A client device and a server device are in communication with one another via a network. The client device is configured to (a) display a first dialog box in accordance with first dialog box data and first dialog box state data received from the server device, and (b) set the first dialog box as a currently active dialog box. The client device includes at least one processor configured to at least: detect registered change events made in respect of displayed dialog boxes and displayed sub-dialog boxes; and transmit to the server device current dialog box state data associated with the currently active dialog or sub-dialog box, following detection of a registered change event. The server device includes at least one processor configured to at least: transmit first dialog box data and first dialog box state data to the client device, in order to instruct the client device to perform (a) and (b); receive the current dialog box state data transmitted from the client device; process a dialog box function associated with the received current dialog box state data. When the current dialog box state data received from the client device indicates that a new sub-dialog box is to be displayed, as determined by the server device, the at least one processor of the server device is further configured to: create a new server dialog box object for the new sub-dialog box, create an entry for the new server dialog box object in a registry located on the server device, bundle together second dialog box data and second dialog box state data for the new sub-dialog box, with the current dialog box state data, and transmit the bundled together data to the client device, in order to instruct the client device, after the client device has split apart and processed the bundled together data, to update the currently active dialog box, display the new sub-dialog box in accordance with the second dialog box data and second dialog box state data, and set the new sub-dialog box as the currently active dialog box. Otherwise, any updated dialog box data and dialog box state data is transmitted to the client device, in order to prompt the client device to correspondingly update the display of the currently active dialog box.

In certain example embodiments, non-transitory computer readable storage media tangibly store instructions that, when executed by at least one processor of a computer, may perform one of these and/or other methods.

These features, aspects, advantages, and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION OF EXAMPLE EMBODIMENTS OF THE INVENTION

Certain example embodiments concern how dialog boxes can be displayed to a client-side user, e.g., while server-side code is running. In certain example embodiments, on the client side, standard dialog box elements are shown in the dialog box. Client-side events, e.g., caused by user interaction with the dialog box, are converted to parameters for a function call to the server and are processed there. The display of the dialog box may be updated by transferring (possibly only) dialog box item changes as a result of the function call. Thus, an advantage of certain example implementations is that no dialog box specific logic (e.g., data access, dialog box specific functions, etc.) needs to exist on the client side. Instead, the client side may simply render a fixed set of dialog box items.

It becomes possible, e.g., using a dialog box API in accordance with certain example embodiments, to support the display of multiple dialog boxes or dialog boxes on top of a first dialog box, without closing the original dialog box. Such child dialog box(es) may be modal, and result(s) of the child dialog box(es) may be made available for further processing in the original dialog box, potentially before and/or after the child dialog box(es) is/are closed. In some instances, further dialog boxes or sub-dialog boxes can be displayed, even on top of a child-dialog box and, as above, their result may be made available to the calling dialog box. In displaying these child dialog boxes, additional processing requirements are not imposed on, and code transfers are not required for, the client. Instead, client-side events caused by user interactions may be converted to parameters for a function call to the server where they may be processed and, after such processing, the child dialog box may be updated as appropriate.

In view of the foregoing, it will be appreciated that certain example embodiments relate to generic server-side functionality (e.g., a JavaScript interpreter running on the server) that is able to display multi-level modal dialog boxes on client side. More particularly, in certain example embodiments, during the execution of a server side long running operation that has been triggered by a client program, the server side functionality might be interrupted because the user has to specify additional data using a dialog-based form. The server provides dialog box control information and dialog box control content, sends them to the client, and pauses the execution of its operation until the dialog box is finished. A client side user interaction within the dialog box may lead to further code execution on the server side, e.g., which may update the currently displayed dialog box content, initiate the display of nested sub-dialog boxes, etc., with any suitable level of nested dialog boxes. Generic program logic on client side (e.g., which does not execute any code that is specific to a special dialog box) allows dialog boxes to be defined on the server once to display them without any rollout efforts on any client. The entire definition and specific logic thus exists only on server side in certain example embodiments. According to certain example embodiments, for a defined set of user interactions, the action plus the client side content modifications (e.g., selections, text entered to a text field, etc.) are sent to the server.

The server reacts by executing methods of a user-defined dialog box object depending, for example, on the type of client side change. The server may update itself using the provided client side content changes. Inside this server-side method, any suitable type of operation could be performed including, for example, indicating that a sub-dialog box should be displayed. After this handler method is finished, changes to the existing dialog box controls (for example, new data collected by server operations) plus the definition of the sub-dialog box (if any) are returned to the client. The client applies the content changes to the existing dialog box and creates a modal sub-dialog box that is handled exactly the same way as its parent (if the received data defines any such structures).

Returning a dialog box (definition) in the form of a handler method's result has the advantage that the server does not need to run into another wait state (e.g., as the main dialog box has to in accordance with some conventional techniques). One might object that missing modality hinders the server from processing the dialog box's result, but this is not the case: After the sub-dialog box finishes on the client side, it disappears and again transfers its state changes to the server, which calls a handler function of the child dialog box object (e.g., a "getResult( )" method) to return its result, and then passes this result to the parent dialog box object's handler function for closing a child dialog box. This approach advantageously allows the server side dialog box handler objects to be completely independent of each other.

In addition to the controls and their content, a dialog box definition may include a set of possible user actions (e.g., button pressed, selection changed, text edit change, focus change, double click, etc.) that may cause the server handlers to be called. Additional handlers that may be called when the client needs the associated information include, for example: canFinish, canChangePage, isInValidState, canGotoNextPage, canGotoPreviousPage, onActivatePage, onClose(ok/cancel). Such handlers therefore may be added to the set of user actions in certain example embodiments.

This set of actions causing server calls may be created by examining which handler functions are really implemented by the dialog box handler object in the script. This technique may help reduce the total number of server calls during user interaction on the client, and sometimes even keep this number to a minimum (e.g., provided that the set of actions is carefully and thoughtfully built).

Figure 1:
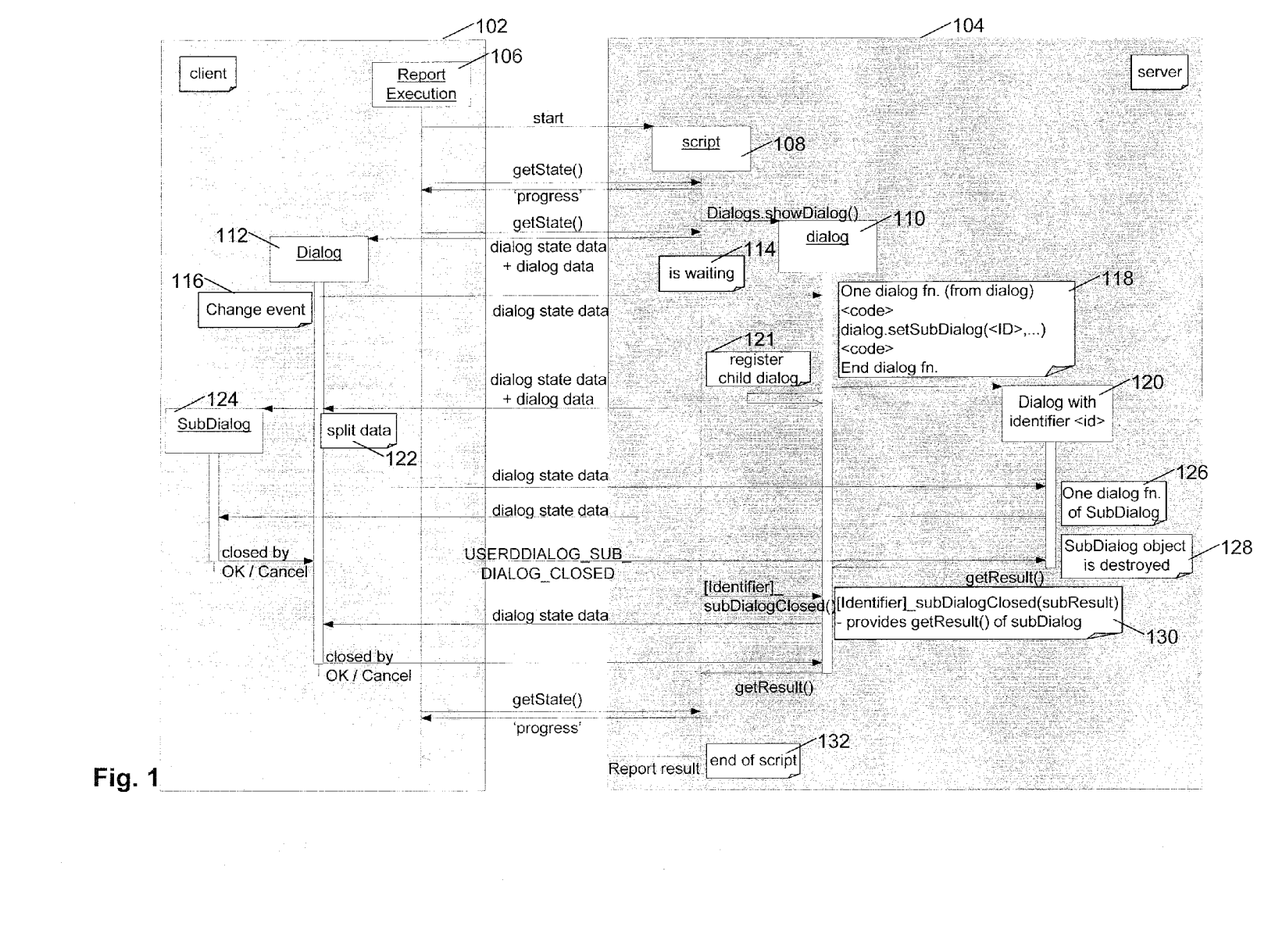
FIG. 1 is diagrammatically illustrates the threads that operate to control nested dialog boxes in accordance with certain example embodiments.
Figure 2A:
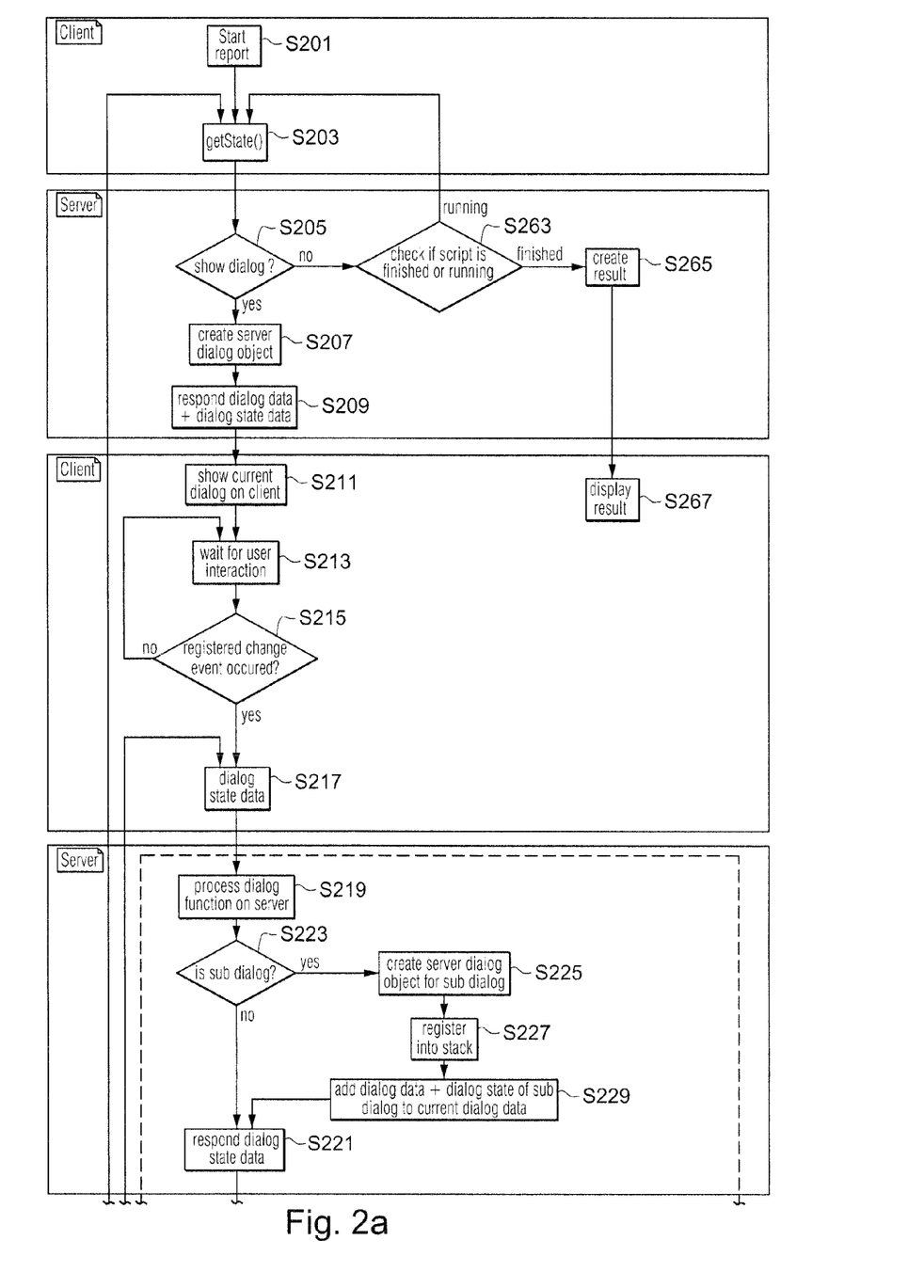
FIGS. 2a-b are parts of a flowchart showing an illustrative process for controlling nested dialog boxes in accordance with certain example embodiments.
Figure 2B:
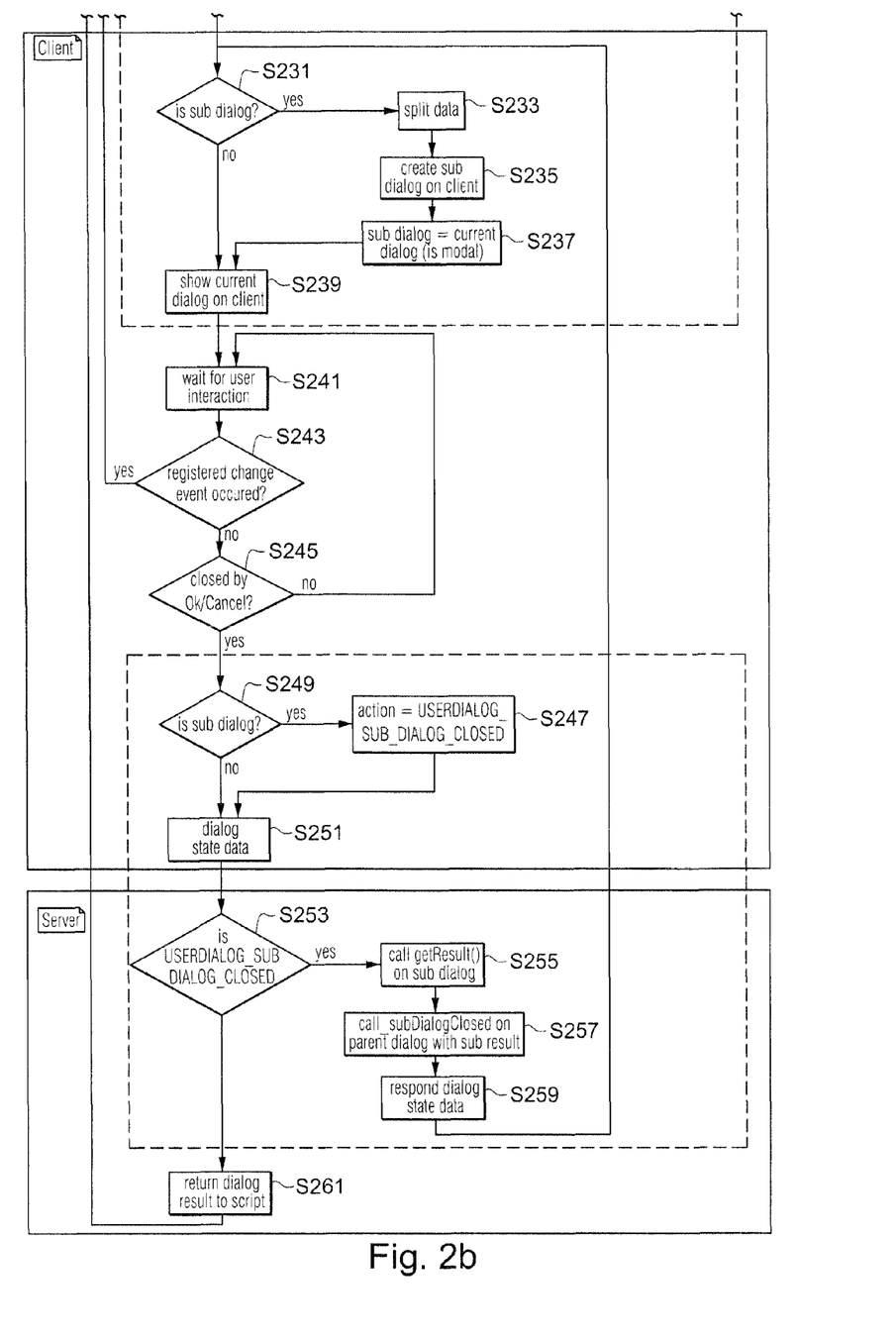

Referring now more particularly to the drawings, FIGS. 1-2b show example client-server interactions for controlling nested dialog boxes in accordance with certain example embodiments. In this regard, FIG. 1 diagrammatically illustrates the threads that operate to control nested dialog boxes in accordance with certain example embodiments, and FIGS. 2a-b are parts of a flowchart showing an illustrative process for controlling nested dialog boxes in accordance with certain example embodiments.

When the user executes a report 106 on the client-side 102, a JavaScript 108 is started on the server-side (step S201). During the script execution, the client 102 sends periodical requests to the server to check whether the current state has changed (step S203) and whether a dialog box must be shown (step S205).

If no dialog box currently has to be shown, the server 104 sends state "progress" to the client 102.

If script code contains a dialog box, a dialog box object 110 is created on the server 104 (step S207). The server 104 is now set to state "dialog" and waits until it gets a request caused by a change event in the dialog box from the client 102. When the client 102 now requests the current state again, the server 104 responds with the dialog box data for the client 102 (step S209), and the dialog box 112 is shown on the client 102 (step S211).

The server 104 is put into a waiting state 114, e.g., to wait until something happens with respect to the dialog box (step S213). If something changes in the dialog box (e.g., a change event 116 is detected in step S215), the client 102 sends the changed dialog box state data (step S217) to the dialog box object 110 on the server 104, and the server 104 processes the relevant dialog box function 118 (step S219). After this dialog box function 118 is finished, the server 104 sends back changed dialog box state data (step S221). This is performed by a single generic function of the server interface, which receives the type of the change and all client side dialog box changes (referred to herein as dialog box state data or simply dialog state data for the sake of brevity). It returns the server side dialog box changes also as dialog box state data.

If this change event 116 additionally or alternatively causes a sub-dialog box to be displayed (as determined in step S223), further steps are taken. For example, after the server 104 has finished the current dialog box function, the child dialog box object 120 is created on the server 104 (step S225), and it is registered 121 into a "stack of active dialogs" (step S227). This stack may be stored in any suitable transitory or non-transitory computer readable storage medium on or in communication with the sever 104.

The server 104 sends the dialog box state data for the original dialog box (e.g., for changes caused by the currently called function), as well as the dialog box data and the dialog box state data for the sub-dialog box. The combination of the data on the server 104 is accomplished in step S229. Assuming that a determination is made in step S231 that there is a sub-dialog box to be displayed, the data 122 is split step (S233) on the client 102 and with its relevant data, the sub-dialog box 124 is created (step S235).

While the main thread that executes the script has to wait until the main dialog box ends, sub-dialog boxes do not need such an individual wait state (e.g., as shown in step S237, the sub-dialog box is modal) because, together with the returned "changed values," the information for the entire dialog box is returned to the client, and the control is back at the client 102, which builds the dialog box and shows it (step S239).

This sub-dialog box is modal so that as long as the sub-dialog box exists, all data sent to the server are data caused by change events of the sub-dialog box. This sub-dialog box works in substantially the same way as the original dialog box (e.g., the process waits for a change event and handles the change by returning, for example, to step S217). Thus, the server 104 waits for change event (step S241). When a change event is detected (step S243), the client 102 sends the changed dialog box state data to the server 104, where the last element in the stack of active dialog boxes processes the relevant dialog box function 126 and responds with possible changes to the dialog box state data.

If the sub-dialog box is closed by an "ok" or "cancel" action (e.g., as determined in step S245), its last action (step S247, e.g., after confirming in step S249 that the "ok" or "cancel" action was taken with respect to the sub-dialog box) is to send this information to the corresponding sub-dialog box object on the server 104. Dialog box state data is generated in step S251, and this server object sends its result to the parent dialog box object and is then destroyed 128. This result is now available in the "subDialogClosed" function 130 of the parent dialog box and can be processed there. In other words, once it is confirmed that that the user sub-dialog box is closed (step S253), the getResult( ) function is called on the sub-dialog box (step S255), the parent dialog box is informed that its sub-dialog box has been closed and it has passed thereto the result(s) of the sub-dialog box (step S257), and the dialog box state data is returned (step S259).

If the main dialog box is closed, it sends its result to the script (step S261) and the main thread continues. If the script is finished running (as determined in step S263) and the end of script 132 is reached, the overall results are created (step S265), and the results are displayed on the client (step S267).

Figure 3:
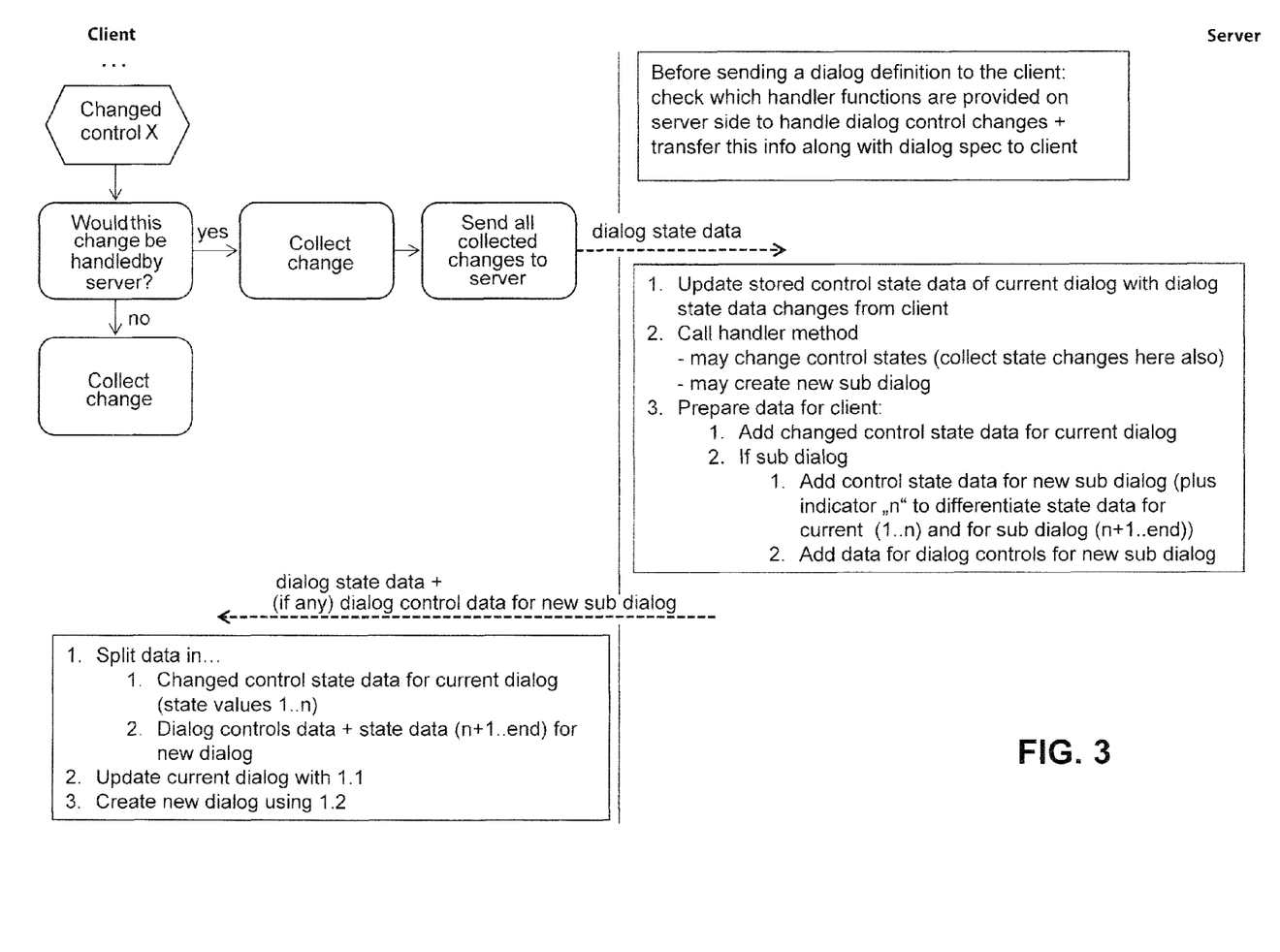
FIG. 3 illustrates how data can be processed on the server and on the client to reduce the overall amount of traffic therebetween, in accordance with certain example embodiments.

FIG. 3 illustrates how data can be processed on the server and on the client to reduce the overall amount of traffic therebetween, in accordance with certain example embodiments. As indicated in FIG. 3, before a dialog box definition is sent to a client, a check is performed to determine which handler functions are provided on the server side to handle dialog box control changes. This information is transferred, along with the dialog box definition, to the client. Thus, when control X is changed on the client side, the client can easily determine whether this particular change would be handled by the server. If so, the change(s) is/are collected, and all collected changes are sent to the server, e.g., as dialog box state data.

The dialog box state data received from the client is used to update control state data for the current dialog box stored on the server. Based on the dialog box state data, handler methods are called, as appropriate. It will be appreciated that, depending on the dialog box state data received from the client, the handler methods called may change control states (which would trigger the collection of state changes here, as well), create a new sub-dialog box, etc. Once the handler methods are called, the data for the client may be prepared. The data may include changed control state data for the current dialog box. If a sub-dialog box is implicated in the request, then this data may be bundled together with the changed control state data for the current dialog box. For instance, control state data for the new sub-dialog box may be included. An identifier may be used to help distinguish different dialog boxes. For instance, a new sub-dialog box may be given the indicator "n" so as to help differentiate state data for the current (1 . . . n) dialog box(es) and for the sub-dialog box(es) (n+1 . . . end). The data for dialog box controls for the new sub-dialog box also may be bundled therewith.

Thus, dialog box state data, along with any dialog box control data for the new sub-dialog box, may be transmitted together back to the client. The client may determine whether this data is to be split, e.g., into changed control state data for the current dialog box (e.g., for state values 1 . . . n), and into dialog box control data and state data (for state values n+1 . . . end) for the new dialog box. The former is used to update the current dialog box, while the latter is used to create any new dialog boxes.

Thus, it can be seen that certain example embodiments advantageously involve bundling dialog box and sub-dialog box data in one function, and then splitting the data on the client side for dialog and/or sub-dialog box rendering, as appropriate. In this way, dialog boxes and sub-dialog boxes can be displayed simultaneously, where data (and not, for example, program logic) is transferred to make this possible, and where control logic is implemented on a server (and not, for example, on the client), thereby providing faster access to needed data.

Figure 4:
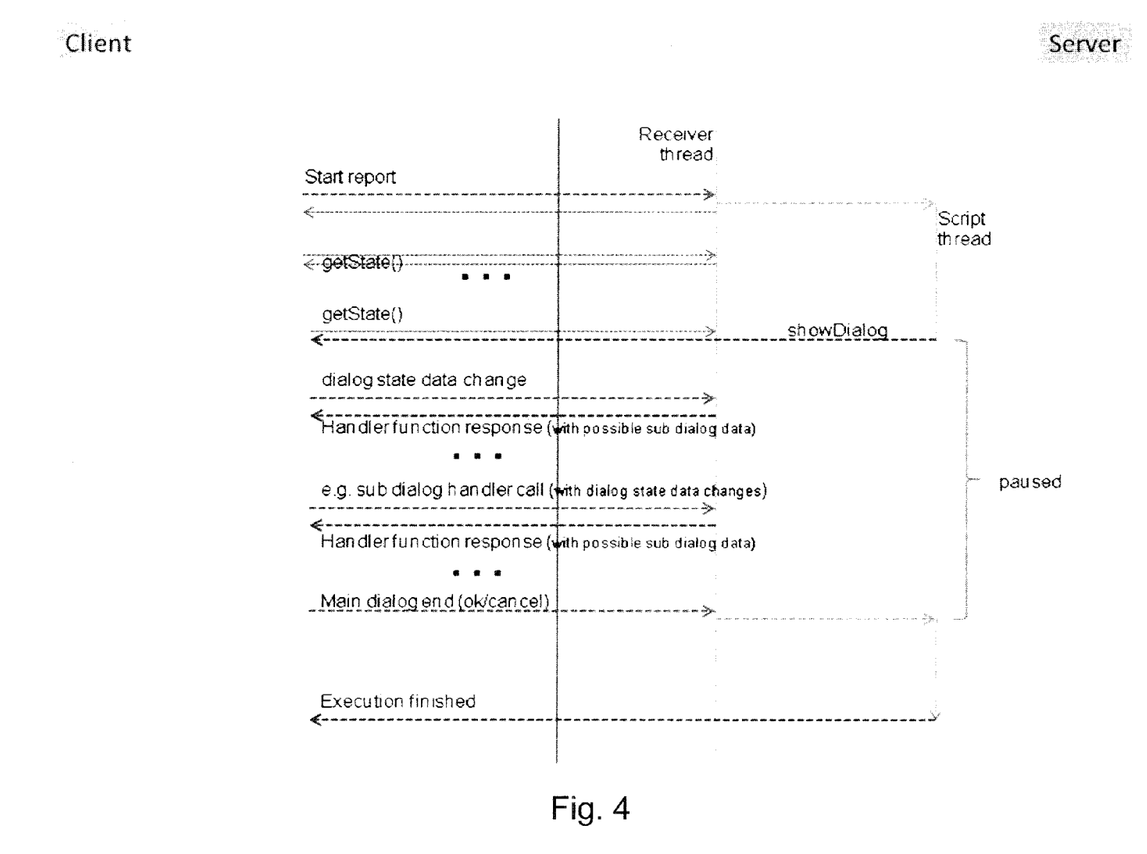
FIG. 4 helps explain how server-side threads operate, in accordance with certain example embodiments.

FIG. 4 helps explain how server-side threads operate, in accordance with certain example embodiments. FIG. 4 groups the events from FIG. 1 and identifies the receiver and script threads, and also shows the "paused" interval.

Figure 5:
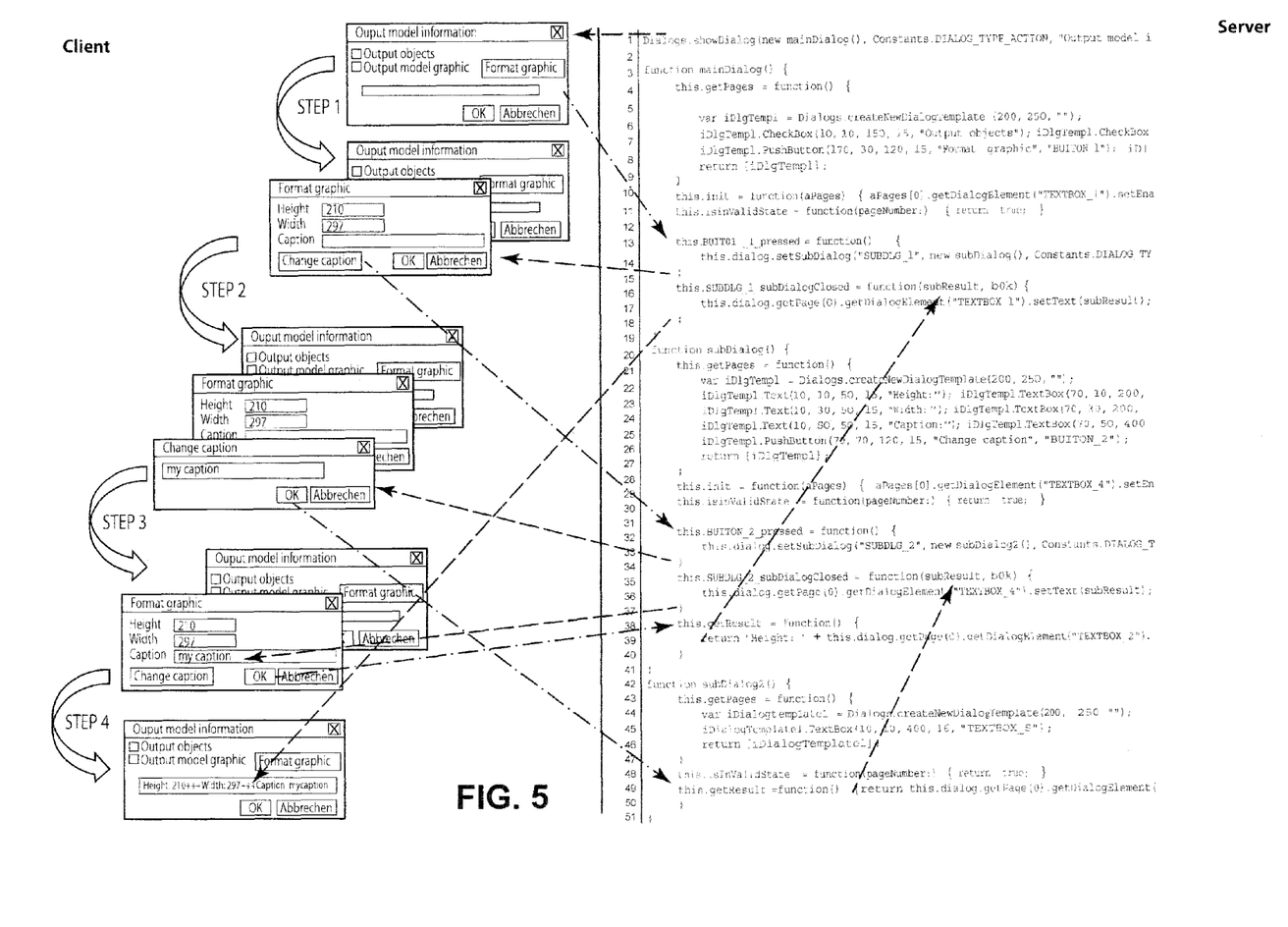
FIG. 5 is an example implementation that helps demonstrate how certain example techniques described herein can be used to leverage sub-dialog boxes in connection with an ARIS report script.

ARIS, which is commercially available from the assignee of the instant application, is able to evaluate modeled information in connection with reports. A separate report API based on JavaScript is available that allows for the easy creation of such evaluations. These reports currently are executed on the server side. Thus, the logic of the report is implemented on the server side, and the client only displays dialog boxes and then reports the result. Dialog boxes can be displayed at any point in time of report execution. Unfortunately, however, in ARIS, only one dialog box can be opened at a time and, as such, the simultaneous opening of a further sub-dialog box is not possible. However, the techniques of certain example embodiments can be used to enhance the ARIS product and its report generation capabilities. In this regard, FIG. 5 is an example implementation that helps demonstrate how certain example techniques described herein can be used to leverage sub-dialog boxes in connection with an ARIS report script. In this example, a main dialog box "Output model information" is created, with a text box and the push button "Format graphic," among others.

As shown in Step 1 of FIG. 5, when the user presses the "Format graphic" push button, a "Format graphic" sub-dialog box opens on the client side. The "Format graphic" sub-dialog box includes a text box and the "Change caption" push button, among others. Thus, on the server side, the function "BUTTON_1_pressed" is called, and this function generates the sub-dialog box.

As shown in Step 2 of FIG. 5, when the user presses the "Change caption" push button on the first sub-dialog box, a second sub-dialog box entitled "Change caption" opens. This second sub-dialog box includes a text box to enter the text for the caption. Thus, on server side, the function "BUTTON_2_pressed" is called, and this function generates the second sub-dialog box.

As shown in Step 3 of FIG. 5, a text for the caption was entered, and when the user now presses the "Ok" button, the second "Change caption" sub-dialog box is closed, and the entered text is correspondingly shown in the "Format graphic" sub-dialog box. This is accomplished by having the second sub-dialog box, on the server side, return the entered text as its result, and this result is correspondingly made available in the sub-dialog box in function "SUBDLG_2_subDialogClosed," where it is assigned to the text box in the sub-dialog box.

As shown in Step 4 of FIG. 5, in addition to the text for the caption, height and width values were entered. When the user now presses the "Ok" button, the "Format graphic" sub-dialog box is closed, and all the entered values are correspondingly reflected in the "Output model information" main dialog box. Thus, on server side, the sub-dialog box returns a string with all the entered text as its result, and this result is correspondingly made available in the main dialog box in function "SUBDLG_1_subDialogClosed," where it is assigned to the text box in the main dialog box.

To create a dialog box, the method "Dialogs.showDialog( )" may be used, where first parameter is a dialog box object. Thus, a dialog box object may be created first, and this dialog box object may have a set of handler functions. The following are basic handlers that may be implemented in connection with certain example embodiments. Of course, it will be appreciated that these and/or other similar or different handlers may be provided in connection with different implementations of the technology described herein.

getPages( ): In this handler function, a dialog box template for every page is defined and filled with the required controls. Each control may include an identifier so that it can be subsequently referenced. The return value may be an array of the created templates.

isInValidState(pageNumber): This handler function may be used to define whether a page is in a valid state. The function returns true if the page is in a valid state. For instance, "Ok," "Finish," "Next," and/or the like may be enabled if a valid state is indicated as being true. In some instances, this function may be called each time a dialog box value is changed by the user (e.g., a button is pressed, a list selection is made, a text field value is specified, a table entry is made, a radio button is selected, etc.).

The API of certain example embodiments may in some cases additionally or alternatively offer some further handler functions, e.g., where such implementations are optional. It also may implement a getResult( ) function, e.g., to return the dialog box result. For instance, in certain example embodiments, the result of this function may be returned as result of Dialogs.showDialog( ), e.g., in accordance with the above.

The dialog box object may offer the following and/or other dynamic handler functions for the controls that are used in this dialog box object:

DialogControlXYZ_changed( ): If this handler is implemented, it may be called if the text of the dialog box control created with the name "DialogControlXYZ" (in getPages( )) is changed. It can be defined for DropListBox, TextBox, and/or other controls.

DialogControlXYZ_focusChanged(gained): If this handler is implemented, it may be called if the focus of the dialog box control created with the name "DialogControlXYZ" (in getPages( )) is changed. If the control gets the focus, the parameter gained may be set to true, whereas the parameter gained may be set to false if the control loses the focus.

DialogControlXYZ_pressed( ): If this handler is implemented, it may be called if the push button with the name "DialogControlXYZ" (in getPages( )) is pressed.

DialogControlXYZ_selChanged(newSelection): If this handler is implemented, it may be called if the selection of the dialog box control created with the name "DialogControlXYZ" (in getPages( )) is changed. It can be defined for CheckBox, ComboBox, DropListBox, ListBox, Tree, OptionGroup, and/or other controls.

The API of certain example embodiments may additionally or alternatively offer the following and/or other methods to display other dialogs or dialog boxes on top of the current dialog box:

UserDialog.setSubDialog( ): This function can be called inside a report dialog box function to create a sub-dialog box to be displayed after the dialog box function has finished. The first parameter is an identifier so that it can be subsequently referenced, and the second parameter is a dialog box object that is created in the same way as for a "normal" dialog box.

SubDlgIdentifierXYZ_subDialogClosed(subResult, bOk): If this handler is implemented, it may be called if the sub-dialog box created with the identifier "SubDlgIdentifierXYZ" is closed.

Figure 6:
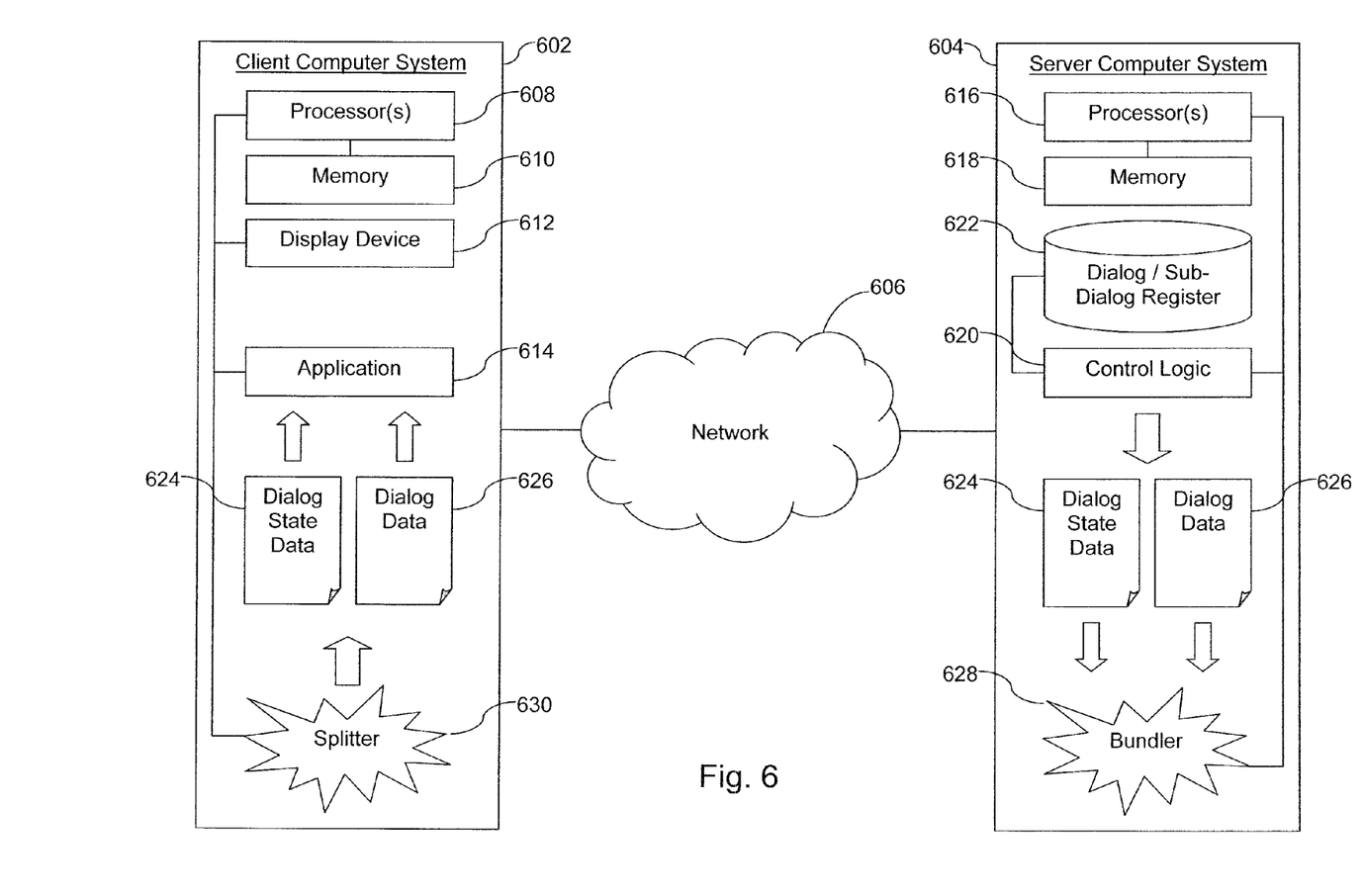
FIG. 6 is a simplified block diagram of a system configured to enable server-controlled display of nested multi-level client dialog boxes, in connection with certain example embodiments.

FIG. 6 is a simplified block diagram of a system configured to enable server-controlled display of nested multi-level client dialog boxes, in connection with certain example embodiments. As shown in FIG. 6, a client computer system 602 is connected to a server computer system 604 via a network 606 (e.g., the Internet, a LAN, a WAN, and/or the like). Although a single client computer system 602 is shown as being connected to a single server computer system 604, one-to-one, one-to-many, and/or many-to-one relationships may be provided in connection with different example embodiments, e.g., through one or more suitable networks.

The client computer system 602 includes processing resources such as, for example, at least one processor 608 and a memory. Similar to the client computer system 602, the server computer system 604 includes processing resources such as, for example, at least one processor 616 and a memory 618. Control logic 620 for generating dialog boxes and/or sub-dialog boxes for display on the client computer system 602 via the application 614 also is provided. The control logic 620 may include, for example, JavaScript or the like. It also may be connected to a dialog/sub-dialog box register 622, which may at least temporarily store an indication of the dialog and/or sub-dialog boxes created for the application, as well as an identifier, relevant state data, content data, and/or the like, for each such entry. Although not expressly shown in FIG. 6, the server computer system 604 also may include a non-transitory computer readable storage medium, e.g., for tangibly storing the control logic 620 and/or the register 622. Such information may be stored local to or remote from the server computer system 604 in different example embodiments. 610. A display device 612 is connected to the client computer system 602, e.g., a user can interact with an application 614. The application 614 may be a web-based or non-web-based application in different example embodiments. Furthermore, the application 614 may be a visualization, report generating, or other tool or software program in different example embodiments. Although not expressly shown in FIG. 6, the client computer system 602 also may include a non-transitory computer readable storage medium, e.g., for tangibly storing the application 614.

When a change is initiated at the client computer system 602 (e.g., the user opens a new sub-dialog box, closes an existing sub-dialog box, enters a value into a fillable field, etc.), the control logic 620 may take an appropriate action. This may include, for example, determining that a new dialog or sub-dialog box should be created, validating changes, making sure that changes are propagated to multiple other dialog boxes, etc. Any new objects may be registered with the register 622. The relevant dialog box state data 624 and/or dialog box data 626 may be updated and extracted, e.g., for each implicated dialog and/or sub-dialog box. These entries may be packaged together via the bundler 628, and transmitted together, as one bundle, back to the client computer system 602. The client computer system 602, upon receiving this data, may feed it to a splitter 630, e.g., to retrieve that relevant dialog box state data 624 and/or dialog box data 626. This information may be provided back to the application 614 to make sure that the user interface is updated accordingly. Thus, it can be seen that the data remains separate from the control logic, and that substantially all functionality is provided on the server computer system 604. Because the data is bundled together, it advantageously becomes possible to reduce network traffic, and this effect is compounded by the fact that separate control logic remains on the server computer system 604 and is not transmitted over the network 606. The client computer system 602 includes only a generic splitter 630 and application 614 for processing the data.

Although certain example embodiments have been described as relating a single parent-child (sub-)dialog box pair, certain example embodiments may involve the bundling and splitting of additional dialog box state data and dialog box data, e.g., so that plural (and potentially all) levels of data could be bundled and subsequently split, in different example embodiments.

It will be appreciated that the example techniques disclosed herein are independent of any specific client technology. For example, the client dialog boxes could be rendered in a Java Swing technology, in a browser-based technology (e.g., Flash, JavaScript, etc.), or using other suitable renderers. In certain example embodiments, the client side does not execute any code that is specific to a special dialog box. Thus, in such embodiments, there is only generic functionality on client side that helps build a dialog box from the server-provided data. Indeed, because the client only needs to convert structured data to dialog box elements and/or dialog box element content and to call a single function on dialog box changes, it is possible to implement the example techniques disclosed herein in connection with other environments (such as, for example, Flash-based environments).

It is noted that the term "dialog" and "dialog box" may be used interchangeably. The same holds true for the terms "sub-dialog" and "sub-dialog box," and other similar terms. Furthermore, the word "box" as in "dialog box," "sub-dialog box," etc., should not be strictly interpreted so as to require any particular shape or constitution, as those skilled in the art know that dialogs can be shown in any number of different shapes and/or constitutions (e.g., with rounded corners, shadows, etc.).

It will be appreciated that as used herein, the terms system, subsystem, service, programmed logic circuitry, and the like may be implemented as any suitable combination of software, hardware, firmware, and/or the like. It also will be appreciated that the storage locations herein may be any suitable combination of disk drive devices, memory locations, solid state drives, CD-ROMs, DVDs, tape backups, storage area network (SAN) systems, and/or any other appropriate transitory or non-transitory/tangible computer readable storage medium. It also will be appreciated that the techniques described herein may be accomplished by having at least one processor execute instructions that may be tangibly stored on a non-transitory computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for displaying dialog boxes on a client computer system, the method comprising:
    (a) when it is determined by a server computer system that a first dialog box is to be displayed on the client computer system, transmitting first dialog data and first dialog state data from the server computer system to the client computer system, in order to prompt the client computer system to display the first dialog box in accordance with the first dialog data and first dialog state data and to make the first dialog box a currently active dialog box;
    (b) receiving, at the server computer system and from the client computer system, current dialog state data associated with the currently active dialog box, following a registered change event detected via the client computer system;
    (c) processing, via the server computer system and independent from the client computer system, a dialog function associated with the received current dialog state data; and
    (d) when the current dialog state data indicates that a new sub-dialog box is to be displayed, as determined by the server computer system, using the server computer system to:
        create a new server dialog object for the new sub-dialog box,
        create an entry for the new server dialog object in a registry located on the server computer system,
        bundle together second dialog data and second dialog state data for the new sub-dialog box, with the current dialog state data and current dialog data, and
        transmit the bundled together data to the client system, in order to prompt the client computer system, after the client computer system has split apart and processed the bundled together data, to display the current dialog box in accordance with the current dialog state data and the current dialog data, to display the new sub-dialog box in accordance with the second dialog data and second dialog state data, and to make the new sub-dialog box the currently active dialog box, and
    otherwise transmitting to the client computer system any updated dialog data and dialog state data, in order to prompt the client computer system to correspondingly update the display of the currently active dialog box.

2. The method of claim 1, wherein the new sub-dialog box is modal.

3. The method of claim 1, further comprising (e) repeating (b)-(d) until the first dialog box and all opened sub-dialog boxes are closed.

4. The method of claim 1, wherein multiple sub-dialog boxes are openable and displayable on the client computer system at the same time, each said sub-dialog box being modal.

5. The method of claim 1, further comprising when a child dialog box is closed, updating its corresponding parent dialog box based on any changes to the child dialog box, as appropriate.

6. The method of claim 1, wherein the dialog state data specifies a type of change and all related client side dialog box changes.

7. The method of claim 1, wherein the client computer system includes program logic for rendering a fixed set of dialog elements but lacks dialog specific program logic.

8. The method of claim 1, wherein the bundled together data does not include executable or interpretable program logic.

9. The method of claim 1, wherein registered change events are grouped together into a defined set of user interactions, each having at least one corresponding specified function handler known to the server computer system.

10. The method of claim 1, wherein registered change events include button presses, selection changes, text edits, focus changes, and click events.

11. A non-transitory computer readable storage medium tangibly storing instructions for displaying dialog boxes on a client computer system that, when performed by at least one processor, at least:
   (a) transmit first dialog data and first dialog state data from a server computer system to the client computer system, in order to prompt the client computer system to display a first dialog box in accordance with the first dialog data and first dialog state data and
   to make the first dialog box a currently active dialog box, when it is determined by the server computer system that the first dialog box is to be displayed on the client computer system;
   (b) receive, at the server computer system and from the client computer system, current dialog state data associated with the currently active dialog box, following a registered change event detected via the client computer system;
   (c) process, via the server computer system and independent from the client computer system, a dialog function associated with the received current dialog state data; and
   (d) when the current dialog state data indicates that a new sub-dialog box is to be displayed, as determined by the server computer system, use the server computer system to:
   create a new server dialog object for the new sub-dialog box,
   create an entry for the new server dialog object in a registry located on the server computer system,
   bundle together second dialog data and second dialog state data for the new sub-dialog box, with the current dialog state data and current dialog data, and
   transmit the bundled together data to the client system, in order to prompt the client computer system, after the client computer system has split apart and processed the bundled together data, to display the current dialog box in accordance with the current dialog state data and the current dialog data, to display the new sub-dialog box in accordance with the second dialog data and second dialog state data, and to make the new sub-dialog box the currently active dialog box, and
   otherwise transmit to the client computer system any updated dialog data and dialog state data, in order to prompt the client computer system to correspondingly update the display of the currently active dialog box.

12. A dialog box/sub-dialog box control system, comprising:
   a client device and a server device in communication with one another via a network, the client device being configured to (a) display a first dialog box in accordance with first dialog data and first dialog state data received from the server device and (b) set the first dialog box as a currently active dialog box;
   wherein the client device includes at least one processor configured to at least:
   detect registered change events made in respect of displayed dialog boxes and displayed sub-dialog boxes, and
   transmit to the server device current dialog state data associated with the currently active dialog or sub-dialog box, following detection of a registered change event; and
   wherein the server device includes at least one processor configured to at least:
   transmit first dialog data and first dialog state data to the client device, in order to instruct the client device to perform (a) and (b),
   receive the current dialog state data transmitted from the client device,
   process a dialog function associated with the received current dialog state data, and
   when the current dialog state data received from the client device indicates that a new sub-dialog box is to be displayed, as determined by the server device:
   create a new server dialog object for the new sub-dialog box,
   create an entry for the new server dialog object in a registry located on the server device,
   bundle together second dialog data and second dialog state data for the new sub-dialog box, with the current dialog state data, and
   transmit the bundled together data to the client device, in order to instruct the client device, after the client device has split apart and processed the bundled together data, to update the currently active dialog box, display the new sub-dialog box in accordance with the second dialog data and second dialog state data, and set the new sub-dialog box as the currently active dialog box, and
   otherwise transmit to the client device any updated dialog data and dialog state data, in order to prompt the client device to correspondingly update the display of the currently active dialog box.

13. The system of claim 12, wherein the new sub-dialog box is modal.

14. The system of claim 12, wherein multiple sub-dialog boxes are openable and displayable on the client device at the same time, each said sub-dialog box being modal.

15. The system of claim 12, wherein the server device is further configured to update a parent dialog box based on any changes to a child dialog box when the child dialog box is closed, as appropriate.

16. The system of claim 12, wherein the dialog state data specifies a type of change and all related client side dialog box changes.

17. The system of claim 12, wherein the client device includes program logic for rendering a fixed set of dialog elements but lacks dialog specific program logic.

18. The system of claim 12, wherein the bundled together data does not include executable or interpretable program logic.

19. The system of claim 12, wherein registered change events are grouped together into a defined set of user interactions, each having at least one corresponding specified function handler known to the server device.

* * * * *